Figure 1:
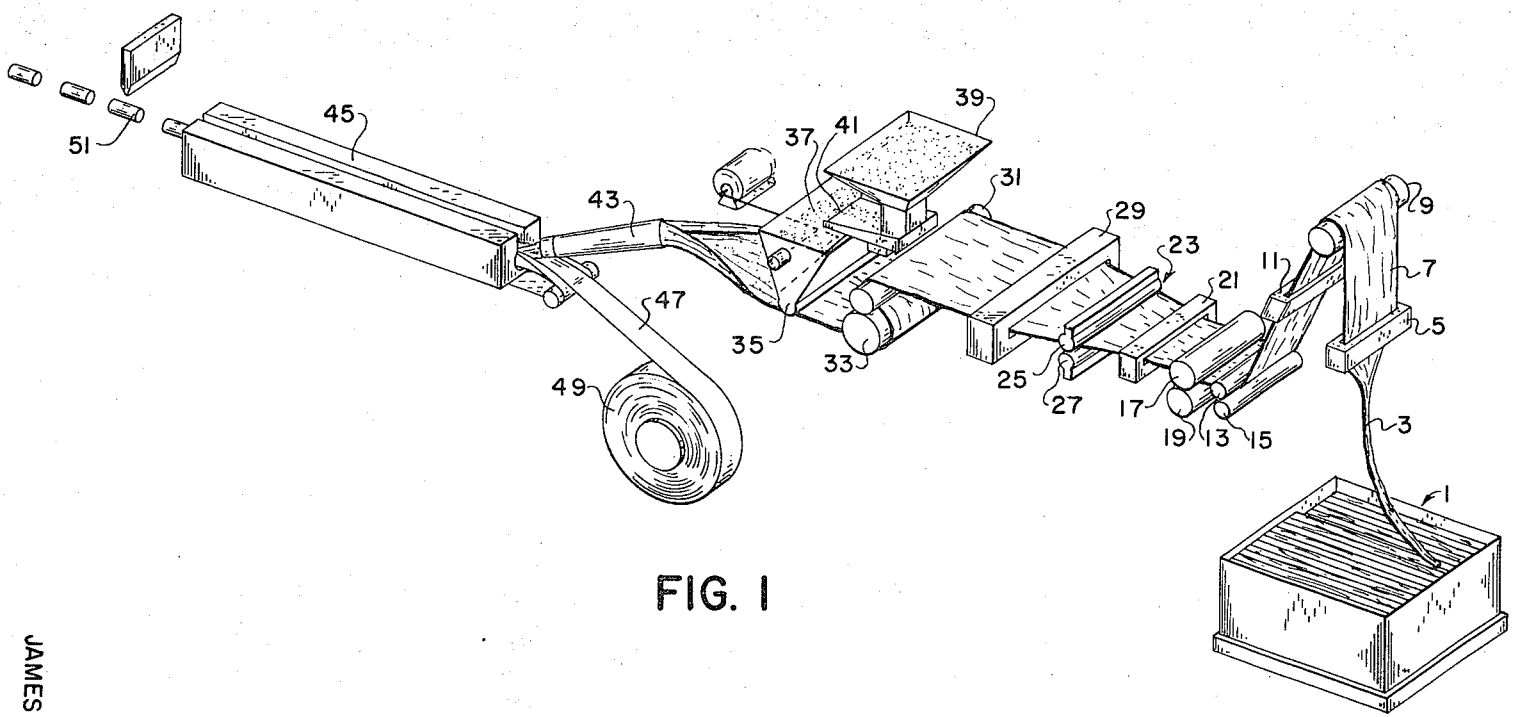
Figure 2:
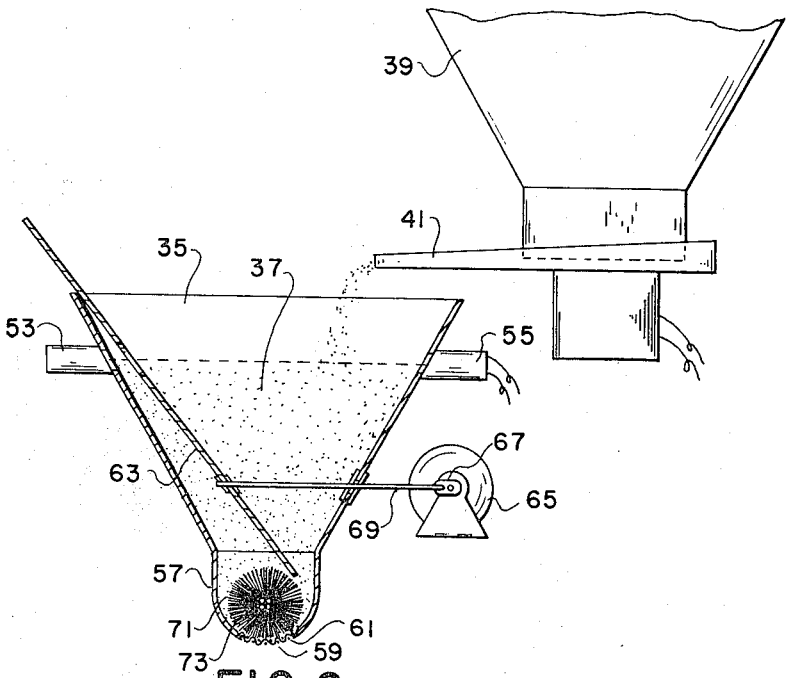
Figure 3:
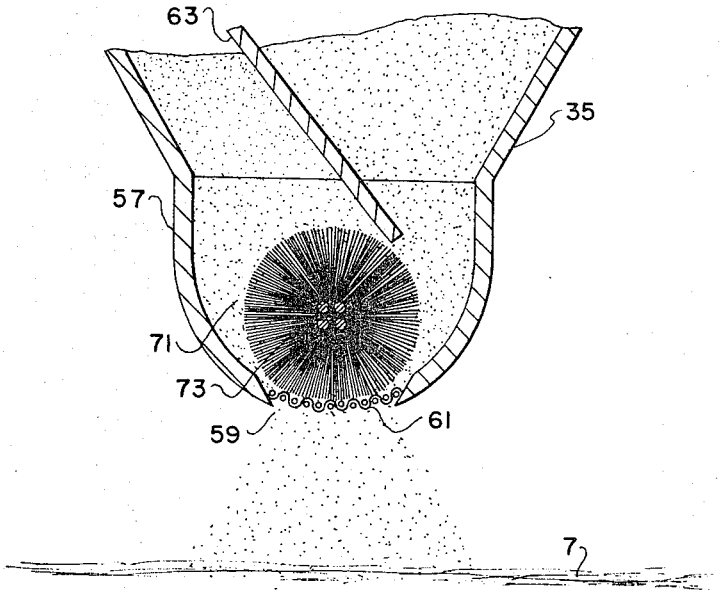
Figure 4:
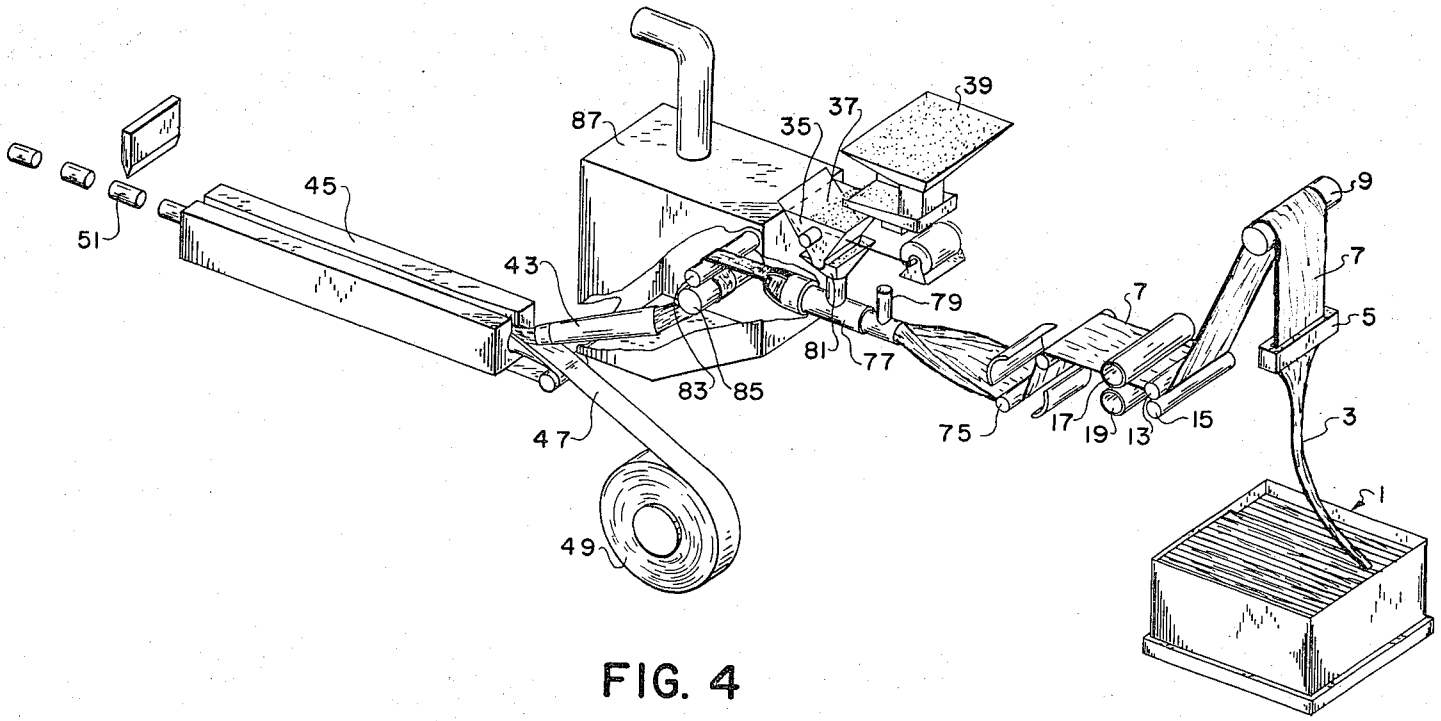

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the discloged subject matter.

PUBLISHED NOVEMBER 24, 1970

880 O.G. 1162

T880,009

APPARATUS AND PROCESS FOR OBTAINING UNIFORM DEPOSITION OF FINELY DIVIDED ADDITIVES ON THE SURFACE OF A BANDED CIGARETTE FILTER TOW

James E. Harris, Bristol, Tenn. (% Tennessee Eastman Company, Box 511, Kingsport, Tenn. 37662)

Filed Jan. 28, 1970, Ser. No. 6,611
Int. Cl. B67d *5/20;* G01f *11/24*
U.S. Cl. 222—56
3 Sheets Drawing. 16 Pages Specification

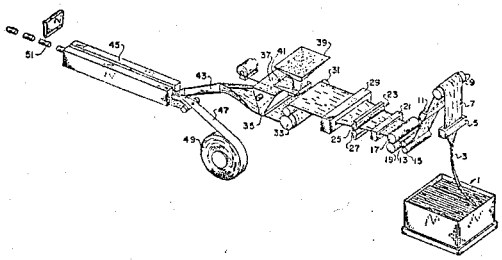

Apparatus for uniform deposition of a finely divided additive on a banded crimped multifilament cigarette filter tow to be used in making a cigarette filter rod. The apparatus comprises a gravity feed hopper, into which is fed finely divided particulate additive, such as hydrated alumina, and provided at its lower or delivery end with an outlet opening covered by a screen of predetermined mesh through which the additive particles fall onto the horizontally moving band and also provided with a rotary brush mounted therein in such relation to the screen portion of the hopper that particles of the additive are forced downwardly through the screen by action of the brush bristles in contact with the upper surface of the screen. By delivering the additive particles to the tow band in this manner any lumps or agglomerates originally present in the additive as fed to the hopper are broken up by the shearing action of the brush against the screen and only individual deagglomerated or nonaggregated particles are permitted to pass through the screen with the result that the additive is continuously and uniformly deposited over the upper surface of the moving tow band.

Nov. 24, 1970 J. E. HARRIS T880009

APPARATUS AND PROCESS FOR OBTAINING UNIFORM DEPOSITION OF FINELY DIVIDED ADDITIVES ON THE SURFACE OF A BANDED CIGARETTE FILTER TOW

Filed Jan. 28, 1970 3 Sheets-Sheet 1

JAMES E. HARRIS
INVENTOR

BY Cecil D. Smith Jr.
William P. Heath Jr.

ATTORNEYS

JAMES E. HARRIS
INVENTOR
BY Cecil D. Quillen Jr.
William P. Heath, Jr.
ATTORNEYS Nov. 24, 1970 J. E. HARRIS T880009

APPARATUS AND PROCESS FOR OBTAINING UNIFORM DEPOSITION OF FINELY DIVIDED ADDITIVES ON THE SURFACE OF A BANDED CIGARETTE FILTER TOW

Filed Jan. 28, 1970

3 Sheets-Sheet 3

JAMES E. HARRIS
INVENTOR

Cecil D. Quillen Jr.

BY William P. Heath Jr.

ATTORNEYS